United States Patent [19]

McReynolds et al.

[11] Patent Number: 5,347,384
[45] Date of Patent: Sep. 13, 1994

[54] FIBER OPTIC DISTRIBUTION OF IMAGE DATA

[75] Inventors: John M. McReynolds; Robert A. Glicksman, both of San Jose, Calif.

[73] Assignee: Loral Aerospace Corp., New York, N.Y.

[21] Appl. No.: 906,768

[22] Filed: Jun. 30, 1992

[51] Int. Cl.$^5$ .......................................... H04B 10/20
[52] U.S. Cl. .................... 359/118; 359/152; 359/167; 359/174; 364/713
[58] Field of Search ........ 359/118, 152, 157, 164–165, 359/167, 172–173, 174, 179; 395/162, 163; 364/713

[56] References Cited

U.S. PATENT DOCUMENTS

| 4,506,387 | 3/1985 | Walter | 359/118 |
| 4,760,442 | 7/1988 | O'Connell et al. | 359/118 |
| 4,796,301 | 1/1989 | Uzawa et al. | 359/172 |
| 5,093,911 | 3/1992 | Parks et al. | 395/164 |
| 5,099,346 | 3/1992 | Lee et al. | 359/118 |
| 5,218,356 | 6/1993 | Knapp | 359/118 |

FOREIGN PATENT DOCUMENTS

| 3503364 | 8/1986 | Fed. Rep. of Germany | H04C 25/02 |
| 2597225 | 10/1987 | France | G06F 13/00 |
| 09005422 | 3/1991 | World Int. Prop. O. | H04N 1/32 |

OTHER PUBLICATIONS

Tawara Kiyoshi, "Medical Application Network System", Patent Abstracts of Japan, vol. 012402, Oct. 25, 1986.

Primary Examiner—Richard E. Chilcot, Jr.
Assistant Examiner—K. Negash
Attorney, Agent, or Firm—Kenneth W. Float; Anthnoy W. Karambelas

[57] ABSTRACT

A fiber optic data distribution system for distributing image data between a data storage system and a plurality of image workstations using embedded control signals and a fiber optic link. The data storage system, a host computer, and a plurality of image workstations are all coupled together by way of a local area network. The host computer includes network software and associated files that provide control information and functions for the distribution system. The host computer controls access to the distribution system by setting up the data storage system and workstations and initiating data transfer to and from the workstations. The data distribution system includes a distribution circuit that comprises a high-speed logical switch that is capable of data transfer rates on the order of 100 megabits per second. The distribution circuit is also an electrical to optical converter which transforms electrical signals stored in the data storage system into optical signals and vice versa. The distribution circuit is coupled to an input/output port of the data storage system but is not connected to the host computer or directly to the computer workstations. Optical signals provided by the distribution circuit are carried by a plurality of optical fibers wherein each pair form a bidirectional data link to a specified workstation. An interface card is disposed in each workstation and is coupled to its backplane. The interface card is adapted to transform optical signals into electrical signals and vice versa for display or for transmission to the data storage system.

4 Claims, 1 Drawing Sheet

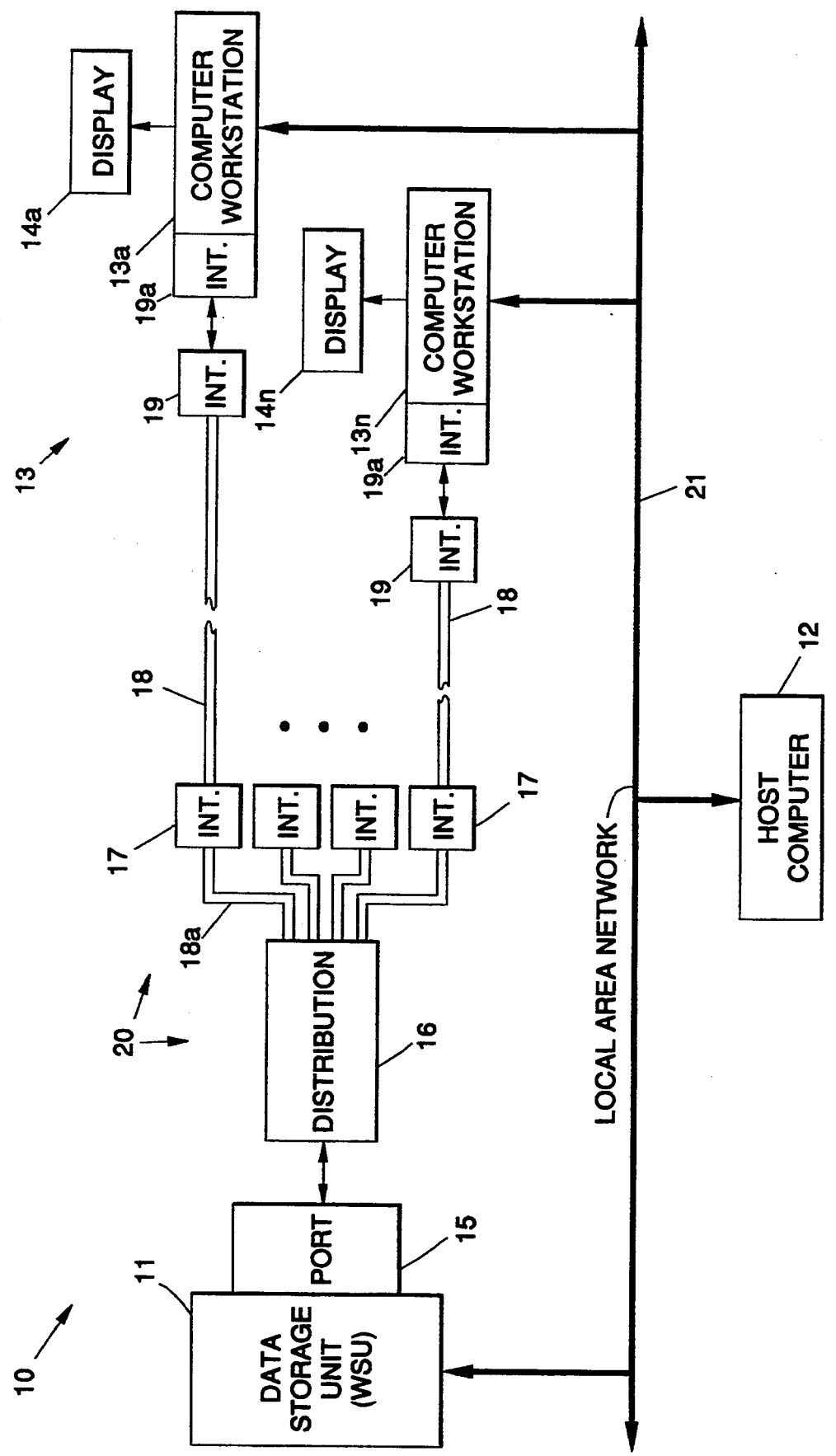

FIBER OPTIC DISTRIBUTION OF IMAGE DATA

BACKGROUND

The present invention relates generally to image data distribution systems, and more particularly, a high-speed fiber optic distribution system that may be employed with such image data distribution systems.

A data storage system known as a working storage unit manufactured by the assignee of the present invention has input/output ports that are connected to multiple computer workstations and that are used for input and output of image data. A straight-forward conventional approach to the connection of the input/output ports to multiple workstations is complicated, requiring control actions that make the data distribution complicated. One such approach is to control data distribution through an RS-232 link from a host computer or from the working storage unit. When a command is sent over the RS-232 link, a connection to a workstation is established and data is allowed to flow to the workstation. This approach requires the RS-232 link and controlling software to send commands to control the data distribution. In addition the data distribution must have additional hardware to interpret and execute the commands. Furthermore, if the distribution system is complex, but is very fast, the data distribution cost per workstation is larger than the cost of the rest of the workstation.

Therefore, it is an objective of the present invention to provide for data distribution apparatus that provides for relatively fast distribution of large blocks of data, such as image data from a data storage system to computer workstations coupled thereto.

SUMMARY OF THE INVENTION

In order to achieve the above and other objectives, the present invention is a fiber optic distribution system for distributing image data using embedded control signals. The present distribution scheme is a very simple control technique that provides for the distribution of image data over a fiber optic link.

The present invention provides for a data distribution system for use with a data storage system, a host computer, and a plurality of computer workstations (image workstations), all of which are coupled together by way of a local area network. The host computer includes network software and associated fries that provide control information and functions for the distribution system, such as an image database and worklists associated with each of the computer workstations. The host computer controls access to the distribution system by setting up the data storage system and the computer workstations and controlling priorities regarding data transfer to and from the computer workstations. However, the host computer is not involved in the actual data transfer.

The data distribution system includes a distribution circuit that comprises a high-speed logical switch that is capable of handling data transfer rates on the order of 100 megabits per second. The distribution circuit is an electrical to optical converter which transforms electrical signals stored in the data storage system into optical signals and vice versa. The distribution circuit is coupled to an input/output port of the data storage system but is not connected to the host computer or directly to the computer workstations. Optical signals provided by the distribution circuit are carried by an optical cable having a plurality of optical fibers. Each of the optical fibers form a bidirectional data link to a specified workstation. A first plurality of optical interfaces or couplers are optionally used to interconnect individual ones of the plurality of optical fibers to individual fiber optic cables that are used to connect to the computer workstations. A second plurality of optical interfaces or couplers are optionally employed at the other ends of each of the fiber optic cables to interconnect the plurality of fiber optic cables to the computer workstations. The second plurality of optical interfaces may be part of an interface card that is inserted into a card slot, for example, in the computer workstation that is coupled to the computer backplane. Such card slots are common in computer workstations such as most available personal computers, for example, that are employed as workstations. The second plurality of optical interfaces (or the interface cards) are also adapted to transform optical signals into electrical signals and vice versa.

Data is transferred between the data storage system and a selected one of the plurality of computer workstations by transmitting a request for the selected workstation to the host computer for use of the fiber optic cable connected to the selected workstation. When the input/output port is free and able to transmit to or receive data from that workstation, the host computer returns a message to the workstation indicating that the fiber optic cable coupled thereto may be used by the workstation. The host computer initializes the data storage system and input/output port and sends information to the workstation as to the address locations of the image data. The workstation then sends a message along the fiber optic cable to the distribution circuit asking that the fiber optic cable be activated (such as by conventional handshake signals). Once the fiber optic cable has been tuned on, the workstation requests transfer of the data by means of a predetermined command. The addresses of the image data in the data storage system are retrieved from the host computer for use in the request, and the data storage system responds to the request by transferring the data. The image data that is to be transferred is sent in one direction with acknowledgements returning to the source of the transmission to control the flow of the image data. A similar procedure is used in transferring data to the data storage system.

Both the data storage system and the interface contain appropriate transmitters and receivers that perform the data transmission and reception. The fiber optic distribution system provides data transmission rates on the order of 100 megabits per second between the data storage system and the workstations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole figure of the drawing shows an image processing system employing a fiber optic distribution system in accordance with the principles of the present invention.

DETAILED DESCRIPTION

Referring to the drawing figure, it shows a an image processing system 10 employing a image data distribution system 20 in accordance with the principles of the present invention. The image processing system 10 is comprised of a data storage unit 11, also known as a working storage unit 11 manufactured by the assignee of the present invention, a host computer 12 and a plurality of computer workstations 13 comprising individual workstations 13a-13n that are each coupled to display monitors 14a-14n that display the image data. The image data is typically electronically stored medical Xrays that are archived in the data storage system 11 and must be quickly distributed to a remotely located workstation 13. The image data is typically a file stored in a compressed format that is on the order of 5 megabits in size. The data storage unit 11 includes an input/output port 15 through which image data is transferred. The data storage unit 11, host computer 12, and plurality of computer workstations 13 are interconnected by way of a local area network 21, such as an Ethernet network, for example. The data storage unit 11 and each of the plurality of computer workstations 13a-13n are interconnected by way of the present image data distribution system 20.

The image data distribution system 20 is coupled to an input/output port 15 of the data storage unit 11. The image data distribution system 20 comprised of a distribution circuit 16 that is coupled by way of a multi-fiber fiber optic cable having a plurality of individual optical fibers 18a to a plurality of interface circuits 17 (or couplers). Each of the interface circuits 17 are individually coupled by way of a single fiber pair optic cable 18 to a second plurality of interface circuits 19 (couplers). The interface circuit 19 may be an external circuit or an internal circuit (forming part of an interface card 19a) such as one described in copending U.S. patent application Ser. No. 07/906,891, filed Jun. 30, 1992 for "Computer Fiber Optic Interface", that is assigned to the assignee of the present invention, the contents of which are incorporated herein by reference.

With reference to the above-cited patent application, the interface circuit 19a may comprise an optical receiver for receiving optical signals from the fiber optic cable 18 and converting them into corresponding electrical signals for display by the workstation 13. An optical transmitter is provided for convening electrical signals derived from the computer workstation 13 into corresponding optical signals and for transmitting them to the data storage system 11. A plurality of data buffers are provided for buffering the electrical signals received from the optical receiver and to be transmitted by the optical transmitter. A compression/expansion circuit is optionally provided for compressing and expanding the electrical signals generated by the optical transmitter or receiver, respectively. The compression/expansion circuit is employed to compress the image data file for storage in the data storage system 11 and to expand a compressed image received from the data storage system 11. A data buffer is provided for buffering data signals received thereby. A backplane interface circuit is provided for interfacing between the data buffer and a computer bus or backplane of the computer workstation 13. The image data is coupled to the backplane and from thee to the display 14 in a conventional manner.

The fiber optic interface circuit 19a described in the above-cited patent application provides for direct fiber interface to the workstation 13. The interface circuit 19a physically accepts the fiber optic cable 18 that carries data signals to and from the data storage system 11 and couples the data onto the computer bus of the workstation 13 at bus transfer rates. The fiber optic cables 18 employed in the distribution system 20 are bidirectional. The fiber optic cable 18 is used to transfer acknowledgement signals to the data storage system 11 and distribution circuit 16. Data flow can thus be in either direction, in that images may flow to the workstation 13 for display, or from the workstation 13 to the data storage system 11 for storage.

The distribution circuit 16 is comprised of a logical switch that is capable of handling data transfer rates on the order of 100 megabits per second. The distribution circuit 16 is also an electrical to optical converter that transforms electrical signals into optical signals and vice versa. The distribution circuit 16 is coupled to the input/output port 15 of the data storage system but is not connected to the host computer 12 or directly to the computer workstations 13.

The interface circuit 19 is optionally used to interconnect individual pairs of the plurality of optical fibers 18a to individual fiber pair optic cables 18 that are used to connect to the computer workstations 13. The second fiber optic interface 19a is optionally employed at the other end of each of the fiber optic cables 18 to interconnect each fiber optic cable 18 to a selected computer workstation 13. The second fiber optic interface 19a may be part of an interface card that is inserted into a card slot in the computer workstation 13 that is coupled to the computer backplane. Such card slots are common in computer workstations such as most available personal computers, for example, that are employed as image workstations. The interface cards 19a are also adapted to transform optical signals into electrical signals and vice versa.

In operation, the image data distribution system 20 provides for distribution of image data from the data storage system 11 (working storage unit 11 ) to the plurality of computer workstations 13. The data storage system 11, the plurality of computer workstations 13, and the host computer 12 are coupled to the local area network 21 and communicate thereacross. In transferring data from the data storage system 11 to a workstation 13, the input/output port 15 of the data storage system 11 supplies data to the distribution circuit 16. The distribution circuit 16 contains no connection to the host computer 12 or any other control system. The fiber optic cables 18 provide a bidirectional data link between the data storage system 11 and the plurality of computer workstations 13. The image data that is to be transferred is sent in one direction (to or from the workstation 13) with acknowledgements returning to the source of the transmission (from or to the data storage system 11) to control the flow of the image data.

With reference to the drawing figure, the selection of the fiber optic cable 18 over which an image is distributed is made by reacting to a request transmitted over the fiber optic cable 18 from a particular workstation 13 after permission for the request has been obtained from the host computer 12. Therefore, control of the flow of data to and from the data storage system 11 is controlled by means of messages sent from the workstations 13 to the host computer 12, and then from the host computer 12 to the data storage system 11, and vice versa.

Control of the channel formed by a particular fiber optic cable 18 is exercised from the workstation 13 coupled to that cable 18. In order to turn on the fiber channel, the workstation 13 requests access to the fiber optic cable 18 from the host computer 12. When the port 15 is free and ready to transmit to or receive from that workstation 13, the host computer 12 returns a message to the workstation 13 indicating that the fiber optic cable 18 coupled thereto may be used. The workstation 13 sends a message down the fiber optic cable 18 to the distribution circuit 16 asking that the fiber optic cable 18 be turned on. There is no competition for the port 15, since the workstation 13 has alleviated the competition through its request for the use of the fiber optic cable 18 from the host computer 12.

Once the fiber optic cable 18 has been tuned on, the workstation 13 requests data from the data storage system 11 by means of an Ethernet command, for example. The image data address locations in the data storage system 11 are retrieved by the workstation 13 from the host computer 12 for use in the request. The data storage system 11 responds by placing the data in an output buffer of the port 15 and starts the data flow.

The implementation of control of the image data distribution system 20 through the fiber optic cable 18 makes the data distribution circuit 16 very simple. There is no computer in the data distribution circuit 16 to interpret commands from the host computer 12. The response to commands over the fiber optic cable 18 is a hardware response to a bit sequence that requests that a particular fiber optic cable 18 be activated. Arbitration is done by interaction with the host computer 12 before there is a request for data from the data storage system 11. The result is a very inexpensive interface between the data storage system 11 and the workstations 13. The present image data distribution system 20 is inexpensive enough that its cost per workstation 13 is small compared to the cost of the workstation 13.

Thus there has been described a new and improved a image data distribution system that may be employed with a image distribution system, workstations and host computer interconnected by way of a local area network. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A data distribution system for use with a data storage system having an input/output port, a host computer, and a plurality of computer workstations, all of which are coupled together by way of a network, and wherein the host computer comprises network software that is adapted to control communication of control signals between the data storage system and the plurality of computer workstations, said data distribution system comprising:

a distribution circuit coupled to the input/output port of the data storage system that is adapted to convert electrical signals derived from the data storage system into optical signals that are to be processed by the computer workstations and for converting received optical signals into electrical signals;

a first plurality of individual optical fibers that are respectively coupled between the distribution circuit and the plurality of computer workstations; and a plurality of interface circuits respectively coupled between the first plurality of individual optical fibers and the computer workstations for converting optical signals into electrical signals that are processable by the computer workstation and for converting electrical signals into optical signals that are transmittable over the first plurality of individual optical fibers to the distribution circuit;

and wherein the distribution circuit is adapted to convert received optical signals transmitted over the first plurality of individual optical fibers into electrical signals that are to be stored in the data storage system.

2. The data distribution system of claim 1 which further comprises:

a fiber optic cable comprising a second plurality of optical fibers that is coupled to the distribution circuit; and a plurality of optical couplers disposed between the second plurality of optical fibers and the first plurality of individual optical fibers that are adapted to couple the second plurality of optical fibers to the first plurality of individual optical fibers.

3. A data distribution system for use with a data storage system having an input/output port, a host computer, and a plurality of computer workstations, all of which are coupled together by way of a network, and wherein the host computer comprises network software that is adapted to control communication of control signals between the data storage system and the plurality of computer workstations, said data distribution system comprising:

a distribution circuit coupled to the input/output port that is adapted to convert electrical signals into optical signals and vice versa;

a first plurality of individual optical fibers that are respectively coupled between the distribution circuit and the plurality of computer workstations;

a plurality of interface circuits respectively coupled between the first plurality of individual optical fibers and the computer workstations for converting optical signals into electrical signals that are processable by the computer workstation and for converting electrical signals into optical signals that are transmittable over the first plurality of individual optical fibers;

and wherein image data are transferred between the data storage system and a selected one of the plurality of computer workstations by transmitting a request from the workstation to the host computer for use of the fiber optic cable coupled thereto, and when the input/output port is available for use, the host computer returns a message to the workstation indicating that the fiber optic cable coupled is available for use in data transfer, and whereafter the workstation sends a message along the fiber optic cable to the distribution circuit for access to the fiber optic cable, and wherein address locations of the image data in the data storage system are passed from the host computer to the computer workstation, and once access to the fiber optic cable has been granted, the workstation requests transfer of the data by means of a predetermined command sent to the data storage system, and wherein the data storage system responds to the command and data transfer commences.

4. The data distribution system of claim 3 which further comprises:

a fiber optic cable comprising a second plurality of optical fibers that is coupled to the distribution circuit; and a plurality of optical couplers disposed between the second plurality of optical fibers and the first plurality of individual optical fibers that are adapted to couple the second plurality of optical fibers to the first plurality of individual optical fibers.

* * * * *